United States Patent
Boles

(10) Patent No.: US 12,073,112 B2
(45) Date of Patent: Aug. 27, 2024

(54) ENABLING MEMORY ACCESS TRANSACTIONS FOR PERSISTENT MEMORY

(71) Applicant: MICRON TECHNOLOGY, INC., Boise, ID (US)

(72) Inventor: David Boles, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/677,535

(22) Filed: Feb. 22, 2022

(65) Prior Publication Data

US 2022/0283735 A1   Sep. 8, 2022

Related U.S. Application Data

(60) Provisional application No. 63/158,120, filed on Mar. 8, 2021.

(51) Int. Cl.
    *G06F 3/06* (2006.01)

(52) U.S. Cl.
    CPC .......... *G06F 3/0656* (2013.01); *G06F 3/0622* (2013.01); *G06F 3/0659* (2013.01); *G06F 3/0679* (2013.01)

(58) Field of Classification Search
    CPC .... G06F 3/0656; G06F 3/0622; G06F 3/0659; G06F 3/0679; G06F 3/061; G06F 3/0608; G06F 3/0683
    See application file for complete search history.

(56) References Cited

U.S. PATENT DOCUMENTS

| | | | | |
|---|---|---|---|---|
| 10,025,845 | B1 * | 7/2018 | Holenstein | G06F 16/2365 |
| 2014/0195564 | A1 * | 7/2014 | Talagala | G06F 12/0804 |
| | | | | 707/802 |
| 2014/0330921 | A1 * | 11/2014 | Storm | G06F 11/1469 |
| | | | | 709/213 |
| 2020/0012603 | A1 * | 1/2020 | Choi | G06F 3/0659 |
| 2020/0065240 | A1 * | 2/2020 | Choi | G06F 12/0246 |

* cited by examiner

*Primary Examiner* — Kalpit Parikh
(74) *Attorney, Agent, or Firm* — LOWENSTEIN SANDLER LLP

(57) ABSTRACT

A first request to initiate a memory access transaction is received by a processing device of a memory sub-system from a host system. One or more host data items are received from the host system. The one or more host data items are stored in a memory buffer residing on a volatile memory device of the memory sub-system. In response to an initiation of one or more operations to commit the memory access transaction, the one or more data items are migrated from the memory buffer to a persistent memory device.

20 Claims, 9 Drawing Sheets

ENABLING MEMORY ACCESS TRANSACTIONS FOR PERSISTENT MEMORY

RELATED APPLICATIONS

This application claims the benefit of U.S. Provisional Application No. 63/158,120 filed Mar. 8, 2021, the entire contents of which are hereby incorporated by reference herein.

TECHNICAL FIELD

Embodiments of the disclosure relate generally to memory sub-systems, and more specifically, relate to enabling memory access transactions for persistent memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
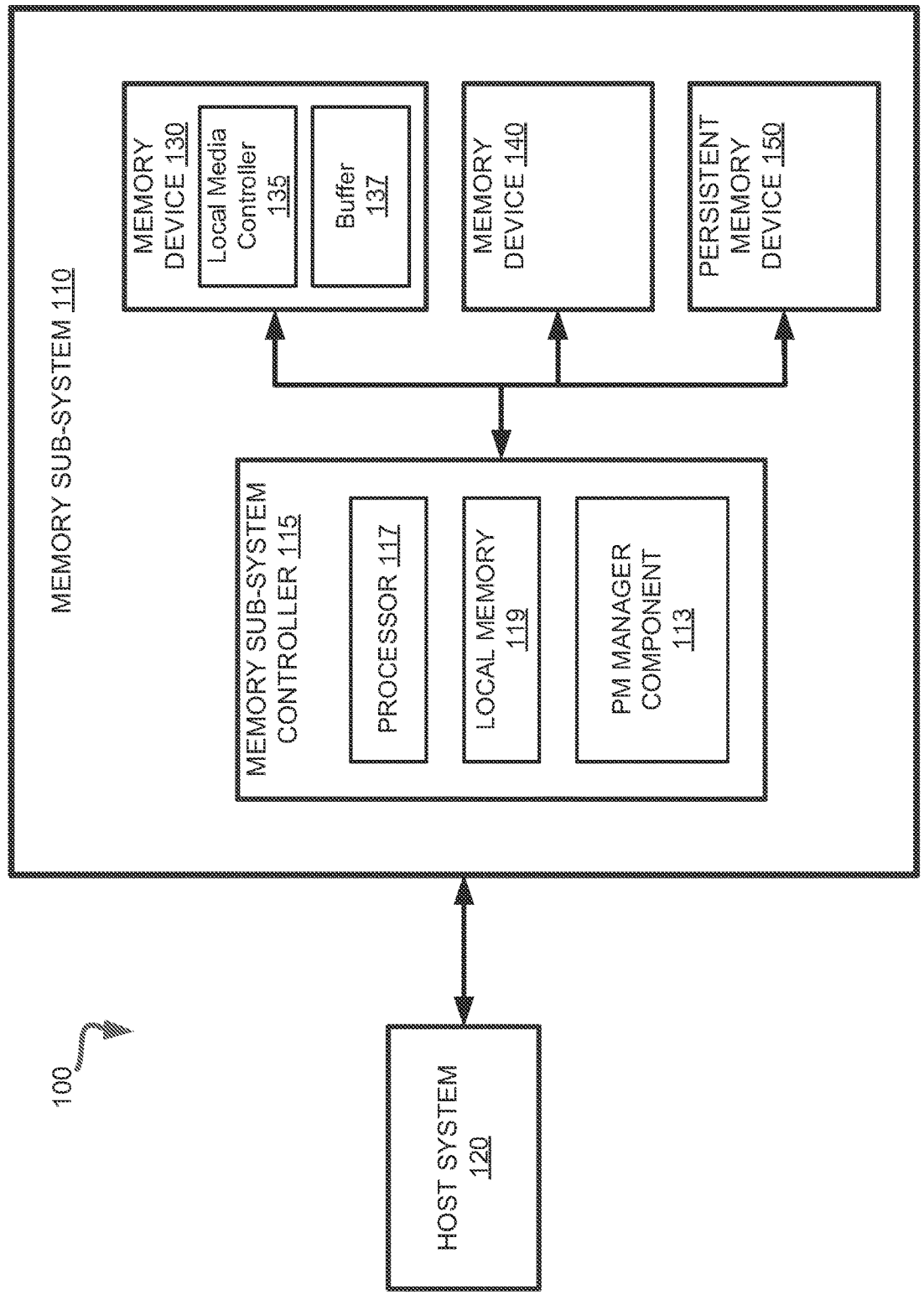
FIG. 1 illustrates an example computing system that includes a memory sub-system, in accordance with some embodiments of the present disclosure.

Aspects of the present disclosure are directed to enabling memory access transactions for persistent memory. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. A controller at the memory sub-system can receive the access requests from the host system and can perform operations to access and/or write the host data at a memory device, in accordance with the request. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

A memory sub-system can be enabled to facilitate storage of host data to persistent memory of the memory sub-system. Persistent memory refers to a memory device or a portion of a memory device (e.g., a persistent memory region herein) that stores data such that that the data can be accessed even after the end of the process that created or last modified the data items. A persistent memory device and/or region can refer a non-volatile memory device or a power-protected volatile memory device (e.g., a power protected dynamic random-access memory (DRAM)). A host system can be coupled to the memory sub-system via, e.g., a Peripheral Component Interconnect Express (PCIe) bus, and can store host data at the persistent memory by transmitting instructions to the memory sub-system controller via the PCIe bus to write the host data at an address of the persistent memory.

Although a memory sub-system can provide a host system with access to a persistent memory device and/or region, the host system and the memory sub-system can consume a significant amount of resources in order to manage storing host data to the persistent memory. For example, for some memory sub-systems, cacheability and/or coherency for host data being stored at the persistent memory involve a significant amount of complexity for a host system utilizing the persistent memory. As a result, a developer for a process running at the host system can develop custom processes to enable the host system to manage the storage of host data to the persistent memory. Such processes can involve a significant number of write operations and/or cache flush operations to record each modification to host data at the host system in the event of a power failure or a system crash for the host system and/or the memory sub-system. This significant number of write and/or flush operations can consume a significant amount of system resources and a significant amount of valuable space at one or more memory devices of the memory sub-system, causing a decrease in overall system efficiency and an increase in overall system latency. Accordingly, these exemplary drawbacks have limited widespread industry adoption as a solution that can make use of transaction oriented persistent memory.

Aspects of the present disclosure address the above and other deficiencies by having a memory sub-system that enables memory access transactions for persistent memory. A memory sub-system can include a volatile memory device and persistent memory device and/or a persistent memory region (referred to collectively as persistent memory herein). The volatile memory device can include a memory buffer that is configured to store host data before the host data is written to the persistent memory, in some embodiments. The persistent memory refers to a non-volatile memory device or a power protected volatile memory device, or a portion of such devices. In some embodiments, the memory sub-system can be coupled to the host system via a compute express link (CXL) interface. In such embodiments, the memory sub-system can be a CXL system configured to support CXL protocols. In additional or alternative embodiments, the memory buffer can reside in the persistent memory region and/or at another non-volatile memory device of the memory sub-system The host system can transmit a request to the memory sub-system to initiate a memory access transaction to store host data at persistent memory of the memory sub-system. A memory access transaction refers to a set of operations to be performed at the memory sub-system to store host data at a range of addresses of the persistent memory. In some embodiments, the request can include an indication of the range of addresses and/or an indication of an amount of host data that is to be stored at the persistent memory for the memory access transaction. In response to receiving the request from the host system, the memory sub-system controller can obtain a transaction identifier for the memory access transaction. In some embodiments, the memory sub-system controller can use the transaction identifier to track a state of a respective transaction, as described below. In some embodiments, the memory sub-system controller can transmit an indication of the transaction identifier to the host system.

Following the request, the host system can transmit one or more host data items (i.e., one or more portions of host data) to the memory sub-system to be stored at a particular address of the range of addresses of the persistent memory. The memory sub-system controller, in response to receiving the one or more host data items, can store the host data items in the memory buffer at the volatile memory device of the memory sub-system. In some embodiments, the memory sub-system controller can store an indication of the particular address of the range of addresses that is associated with the host data item and/or an indication of the transaction identifier for the memory access transaction.

In response to determining that each host data item for the memory access transaction has been transmitted to the memory sub-system controller, the host system can transmit another request to the memory sub-system to commit the memory access transaction. Committing the memory access transaction, for purposes of the present disclosure, refers to completing the process of storing the set of host data items at the range of addresses of the persistent memory. In response to receiving the request to commit the memory access transaction, the memory sub-system controller can migrate the host data items associated with the memory access transaction from the memory buffer to the persistent memory and, in some embodiments, can transmit a notification to the host system of successfully committing the memory access transaction. The memory sub-system controller can be configured to complete the migration of the host data items to the persistent memory even in the event of a power loss or system crash at the memory sub-system and/or the host system.

In additional or alternative embodiments, the memory sub-system controller can store an original state associated with each host data item at the memory buffer. An original state of a data item can include a copy of the data item before the host system updates the data item prior to transmitting the request to commit the memory access transition. The memory sub-system controller can restore an updated data item to the original state using the original state of the data item that is stored the memory buffer (e.g., in response to a request or notification from the host system). The host system can transmit a request to the memory sub-system controller to commit the memory access transaction, as indicated above. In response to receiving the request to commit the memory access transaction, the memory sub-system controller can discard the stored original state associated with each host data item.

Advantages of the present disclosure include, but are not limited to, exposure of persistent memory at a memory sub-system to processes running at a host system with minimal resource consumption by the host system. By maintaining a memory buffer at a volatile memory device of the memory sub-system, the memory sub-system controller is able to execute a CXL protocol that is enabled by the CXL interface connecting the memory sub-system and the host system, which increases cacheability and/or coherency for host data being stored at persistent memory. As a result, expensive processes are not run at the host system to enable the storage of host data to the persistent memory, reducing the consumption of the host system and/or the memory sub-system of expensive system resources. By reducing the consumption of host system and/or memory sub-system resources, an overall system efficiency increases and an overall system latency decreases.

FIG. 1 illustrates an example computing system 100 that includes a memory sub-system 110 in accordance with some embodiments of the present disclosure. The memory sub-system 110 can include media, such as one or more volatile memory devices (e.g., memory device 130), one or more non-volatile memory devices (e.g., memory device 140), or a combination of such. In some embodiments, memory sub-system 110 can further include a persistent memory (PM) device 150. A persistent memory, in accordance with embodiments provided herein, refers to a memory device or a portion of a memory device (i.e., a persistent memory region) that stores data items such that the data can be accessed even after the end of the process that created or last modified the data items. In some embodiments, persistent memory device 150 can be a non-volatile memory device. In other or similar embodiments, persistent memory device 150 can be a power protected volatile memory device (e.g., a power protected dynamic random-access memory (DRAM) device). In some embodiments, memory sub-system 110 may not include a persistent memory device 150 and, instead, memory device 130 and/or memory device 140 can include one or more persistent memory regions. A persistent memory region refers to a portion of a memory device that supports persistent memory storage, in accordance with embodiments described herein. For example, in some embodiments, memory device 140 can be a volatile memory device instead of a non-volatile memory device and at least a portion of memory device 140 can be power protected volatile memory.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

In some embodiments, host system 120 can be coupled to memory sub-system 110 via a compute express link (CXL) interface. In such embodiments, memory sub-system 110 can be a CXL system configured to support CXL protocols. A CXL interface refers to an interface that can support a number of protocols that can run on top of PCIe, including a CXL.io protocol, a CXL.mem protocol, and a CXL.cache protocol. A CXL.io protocol is a PCIe-like protocol that can be viewed as an "enhanced" PCIe protocol capable of carving out managed memory. The CXL interface can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures, in accordance with embodiments described herein. The CXL.cache protocol can define host-device interactions to enable efficient caching of host memory with low latency using a request and response approach. Traffic can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a PM manager component 113 that can be used for storing host data at persistent memory (e.g., persistent memory device 150) of memory sub-system 110. As described above, host data refers to data received by memory sub-system controller 115 by host system 120 for storage at a memory device of memory sub-system 110. In some embodiments, host data can include data associated with a process running on host system 120. In some embodiments, the memory sub-system controller 115 includes at least a portion of the PM manager component 113. For example, the memory sub-system controller 115 can include a processor 117 (processing device) configured to execute instructions stored in local memory 119 for performing the operations described herein. In some embodiments, the PM manager component 113 is part of the host system 110, an application, or an operating system.

In some embodiments, PM manager component 113 can be configured to receive a request from host system 120 to initiate a memory access transaction. A memory access transaction refers to a set of operations to be performed at the memory sub-system 115 (e.g., by PM manager component 113) to store host data at a particular range of addresses of persistent memory device 150. In some embodiments, PM manager component 113 can receive a host data item of the set of host data items and can store the received host data item in a memory buffer 137 residing on a memory device. In some embodiments, memory buffer 137 can reside on a volatile memory device at memory sub-system 110, such as memory device 130. In other or similar embodiments, memory buffer 137 can reside on a non-volatile memory device, such as memory device 140. In still other or similar embodiments, buffer 137 can reside on a local memory for memory sub-system controller 115 (e.g., local memory 119). PM manager component 113 can receive a second request from host system 120 to commit the memory access transaction to the persistent memory device. Committing the memory access transaction, for purposes of the present disclosure, refers to completing the process to store the set of host data items at persistent memory device 150. In response to receiving the second request from host system 120, PM manager component 113 can migrate the set of host data items from memory buffer 137 to persistent memory device 150. Further details regarding storing host data at persistent memory device 150 are provided herein.

Figure 2A:
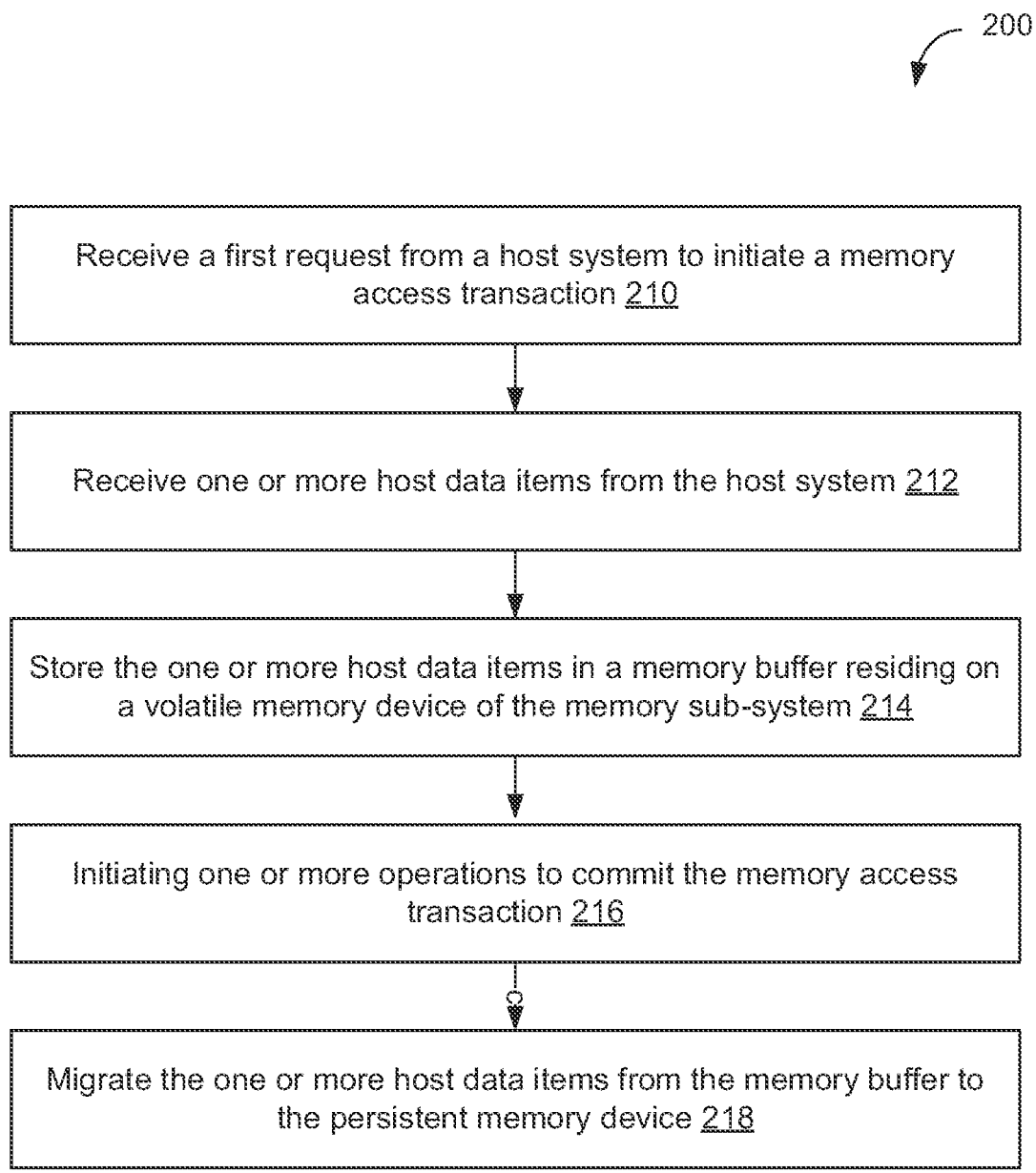
FIG. 2A is a flow diagram of an example method for storing host data at a persistent memory region of a memory sub-system using a persistent memory buffer, in accordance with some embodiments of the present disclosure.

FIG. 2A is a flow diagram of an example method 200 for storing host data at a persistent memory region of a memory sub-system using a persistent memory buffer, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the PM manager component 113 of FIG. 1. In other or similar embodiments, one or more operations of method 200 is performed by another component of the memory sub-system controller. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic can receive a first request from a host system to initiate a memory access transaction. As described above, a memory access transaction refers to a process to store one or more host data items at persistent memory of a memory sub-system (e.g., persistent memory device 150 or a persistent memory region of memory device 130 or memory device 140). It should be noted that although embodiments of the present disclosure describe the host data items being stored at persistent memory device 150, these embodiments are also applicable to storing host data items at a persistent memory region at memory sub-system 110.

Figure 3A:
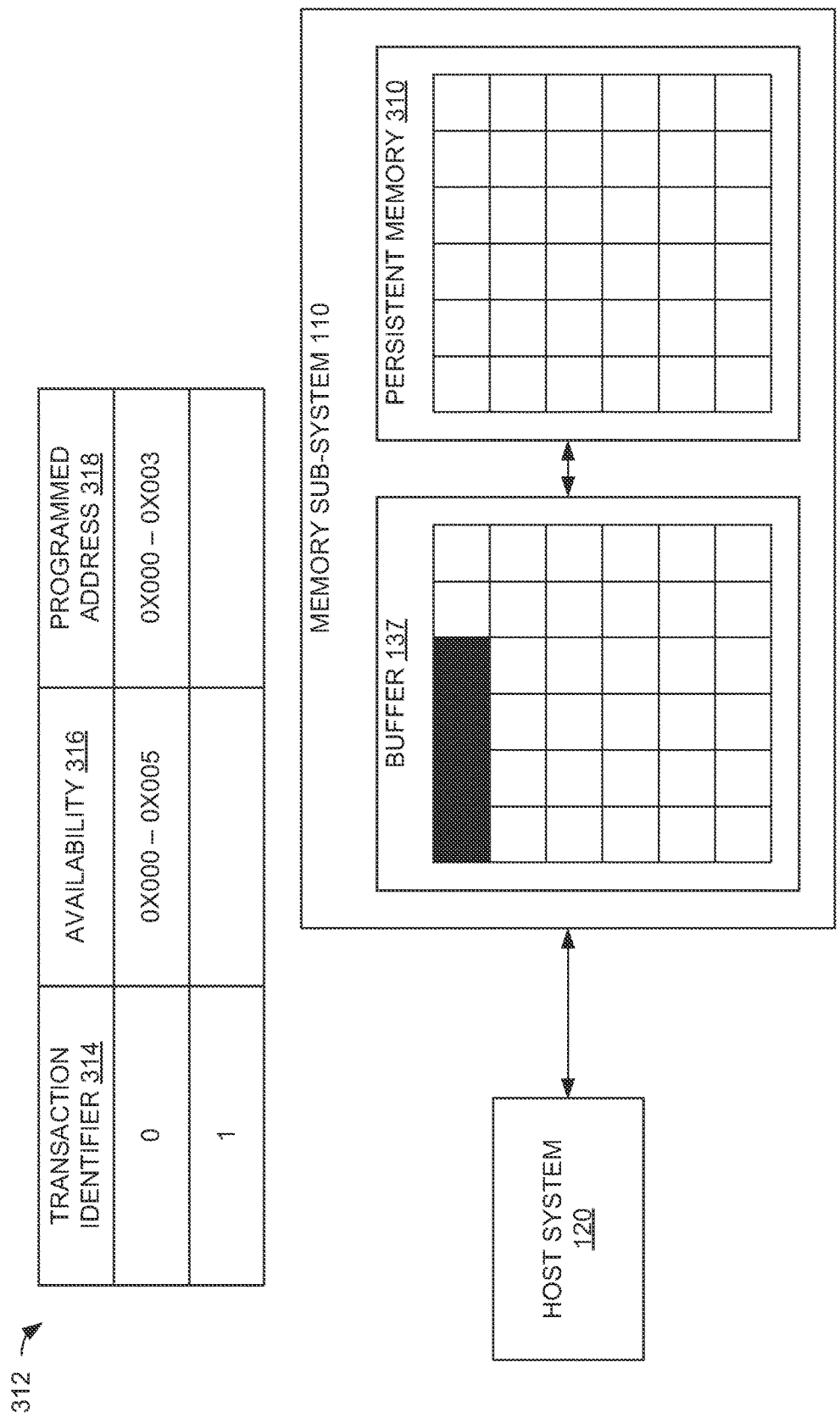
FIGS. 3A-3C illustrate an example of storing host data at a persistent memory region using a persistent memory buffer, in accordance with some embodiments of the present disclosure.

FIG. 3A illustrates an example of storing host data at a persistent memory region of memory sub-system 110, in accordance with embodiments of the present disclosure. As illustrated in FIG. 3A, memory sub-system 110 can include persistent memory 310. Persistent memory 310 can correspond to persistent memory device 150 and/or the persistent memory region, as described previously. Memory sub-system can also include buffer 137, as described above.

In some embodiments, the request from host system 120 can include an indication of a range of virtual addresses of persistent memory device 150 at which the one or more host data items for the memory access transaction are to be stored. The request can further include an indication of an amount of host data for the memory access transaction that is to be stored at the range of virtual addresses of persistent memory device 150. For example, the request can include an indication of a number of words that are to be stored at the range of virtual addresses of persistent memory device 150. In other or similar embodiments, the request can include the indication of the amount of host data for the memory access transaction that is to be stored at persistent memory device 150 and a starting virtual address for the host data at persistent memory device 150. Processing logic can determine the range of virtual addresses for the memory access transaction based on the starting virtual address and the indication of the amount of host data for the memory access transaction.

In response to receiving the request, processing logic can determine whether there is enough available space at a buffer residing on a volatile memory device of memory sub-system 110 to store the host data for the memory access transaction before the host data is migrated to persistent memory device 150. The buffer residing on the volatile memory device can correspond to buffer 137, in some embodiments. In response to determining that there is not enough available space at buffer 137, processing logic can transmit a message to host system 120 indicating that the memory access transaction cannot be completed at memory sub-system 110.

In some embodiments, processing logic can obtain a range of physical addresses of persistent memory device 150 that are mapped to the range of virtual addresses included in the first request. For example, processing logic can access a data structure that includes a mapping of virtual addresses to physical addresses for persistent memory device 150 at a local memory of memory sub-system controller 115 (e.g., local memory 119). The data structure can be a virtual (or logical) to physical address table (e.g., V2P table or L2P table), in some embodiments. Processing logic can retrieve the mapping for each virtual address of the range of virtual addresses to a respective physical address at persistent memory device 150 and store the retrieved mapping at a buffer of local memory 119, in some embodiments.

In some embodiments, responsive to receiving the first request to initiate the memory access transaction, processing logic can store a transaction identifier associated with the memory access transaction, e.g., at local memory 119. The transaction identifier can be a unique identifier that corresponds to the particular memory access transaction of the first request. In some embodiments, processing logic can store multiple transaction identifiers for multiple memory access transactions initiated by host system 120 or another host system coupled to memory sub-system 110. In some embodiments, the first request from host system 120 can include an indication of the transaction identifier associated with the memory access transaction. Accordingly, processing logic can extract the transaction identifier from the first request and store the extracted transaction identifier, e.g., at local memory 119. In other or similar embodiments, processing logic can generate the transaction identifier in response to receiving the first request from host system 120 and store the generated transaction identifier, e.g., at local memory 119. In response to generating the transaction identifier, processing logic can transmit an indication of the transaction identifier to host system 120.

In still other or similar embodiments, a memory space for memory sub-system controller 115 (e.g., local memory 119) can store a transaction identifier data structure, such as data structure 312 illustrated in FIG. 3A. Transaction identifier data structure 312 can include entries for each of a finite set of transaction identifiers that can be used for memory access transactions at memory sub-system 110. Each entry of the data structure can include a field 314 including an indication of a respective transaction identifier and additional field 316 including an indication of whether the transaction identifier is available for a requested memory access transaction. For example, the additional field 316 can include a flag indicating whether the respective transaction identifier is available. In another example, the additional field 316 for an unavailable transaction identifier can include a range of addresses for persistent memory device 150 (e.g., virtual address or physical addresses) that are currently mapped to the unavailable transaction identifier. The additional field 316 for an available transaction identifier can be empty, indicating that the transaction identifier is available. Processing logic can access the data structure to retrieve an available transaction identifier for the memory access transaction of the first request and responsive to identifying an available transaction identifier, can update the entry for the transaction identifier to indicate that the transaction identifier is not available. For example, processing logic can update the flag of the entry to indicate that the transaction identifier is not available. In another example, processing logic can add an indication of the range of memory addresses (e.g., virtual or physical addresses) to the entry to indicate that the transaction identifier is not available. As illustrated in FIG. 3A, processing logic can update an entry associated with the transaction identifier of "0" to indicate the range of memory addresses (e.g., "0X000-0X005") associated with the transaction identifier. The entry associated with the transaction identifier of "1" does not include an indication of a range of memory address and therefore indicates that the transaction identifier is available. In some embodiments, processing logic can store the retrieved transaction identifier, e.g. at local memory 119. In response to retrieving the transaction identifier, processing logic can transmit an indication of the transaction identifier to the host system 120.

The first request to initiate the memory access transaction can include a transaction identifier, as described above. In some embodiments, the transaction identifier included in the first request can be a transaction identifier that is generated by host system 120 before transmitting the first request to memory sub-system 110 (referred to as a host transaction identifier). In such embodiments, processing logic can obtain an additional transaction identifier for the memory access transaction (referred to as the memory sub-system transaction identifier) in response to receiving the first request from host system 12, in accordance with embodiments described above. For example, processing logic can generate the memory sub-system transaction identifier or can retrieve the memory sub-system transaction identifier from a memory sub-system transaction identifier, as described herein. Processing logic can transmit an indication of the obtained memory sub-system transaction identifier to host system 120, as described above. In some embodiments, processing logic can also generate a mapping between the host transaction identifier and the memory sub-system transaction identifier and store the mapping at a memory for memory sub-system controller 15 (e.g., local memory 119). It should be noted that reference to a transaction identifier as provided herein can refer to a host transaction identifier or a memory sub-system transaction identifier, in some embodiments.

At operation 212, processing logic can receive one or more host data items from the host system. In some embodiments, processing logic can receive an instruction to write the one or more host data items to a particular virtual address of persistent memory device 150 within the range of virtual addresses previously described. Processing logic can determine a physical address of persistent memory device 150 that is mapped to the particular virtual address, for example, using the mapping of the virtual addresses included in the first request to respective physical addresses stored at local memory 119, as described above. In other or similar embodiments, processing logic can determine the physical address of persistent memory device 150 using the V2P table or L2P table stored at local memory 119, in accordance with embodiments provided herein.

At operation 214, processing logic can store the one or more host data items in memory buffer 137 residing on a volatile memory device of memory sub-system 110. In some embodiments, processing logic can store an indication of the physical address that is mapped to the virtual address for the one or more host data items with the one or more host data items in memory buffer 137. In other or similar embodiments, processing logic can store an indication of the transaction identifier associated with the memory access transaction of the first request with the one or more host data items in memory buffer 137. In still other or similar embodiments, processing logic can update an entry for the transaction identifier at the transaction identifier data structure to include an indication of an address of the one or more host data items stored in memory buffer 137. As illustrated in FIG. 3A, processing logic can program the host data items to memory buffer 137. In some embodiments, processing logic can update an entry for the transaction identifier to include an indication of an address (e.g., a physical address) of the stored host data item(s) (e.g., 0X000-0X003).

In some embodiments, the one or more host data items received from host system 120 can include an indication of the host transaction identifier for the memory access transaction. In such embodiments, processing logic can determine the memory sub-system transaction identifier for the memory access transaction (e.g., from the mapping stored at local memory 119) and store the indication of the memory sub-system memory access transaction identifier at memory sub-system 110, as described above.

In some embodiments, processing logic can receive a first instruction to store one or more first host data items at a particular virtual address of persistent memory device 150, as described above. Processing logic can store the one or more first host data items, the obtained physical address of persistent memory device 150, and/or the transaction identifier for the memory access transaction at buffer 137, as described above. In some embodiments, processing logic can receive a second instruction to store one or more second host data items at the same virtual address of persistent memory device 150. In response to receiving the second instruction to store the one or more second host data items, processing logic can replace the one or more first host data items and the obtained physical address for the one or more first host data items with the one or more second data items and/or an obtained physical address for the one or more second host data items. For example, processing logic can erase the first host data items, the obtained physical address for the host data items, and/or the transaction identifier from buffer 137 and store the second host data items, the physical address for the one or more second host data items, and/or the transaction identifier at the same portion or at a different portion of buffer 137.

In other or similar embodiments, processing logic can program the one or more second host data items to persistent memory 310 and can maintain the one or more first host data items at buffer 137. In such embodiments, the first host data items can correspond to an original state of host data associated with the virtual address and the second host data items can correspond to an updated state of host data associated with the virtual address. In some embodiments, processing logic can receive a request from host system 120 to revert the host data associated with the virtual address back to the original state. In such embodiments, processing logic can obtain the first host data items from buffer 137 and can replace the second host data items at persistent memory 310 with the first host data items.

Processing logic can receive multiple instructions from host system 120 to store host data items at persistent memory device 150 after the first request from host system 120 is received, in some embodiments. In some embodiments, processing logic does not receive host data items to be stored at persistent memory device 150 within a threshold period of time after the first request from host system 120 is received or after one or more initial instructions to store host data items are received from host system 120. In such embodiments, processing logic can transmit a notification to host system 120 indicating that the memory access transition of the first request is terminated. Processing logic can remove host data items that are associated with the memory access transaction from buffer 137, in some embodiments. For example, processing logic can identify each host data item that is associated with the transaction identifier for the memory access transaction and erase each identified host data item from buffer 137. In some embodiments, processing logic can determine whether a respective data item corresponds to the memory access transaction based on the transaction identifier stored with the respective data item at buffer 137. In other or similar embodiments, processing logic can access a data structure (e.g., at local memory 119 or at memory device 130) that includes a mapping between each address of buffer 137 and an indication of a transaction identifier for host data stored at the respective address. In still other or similar embodiments, processing logic can access the transaction identifier data structure (e.g., at local memory 119) and can determine, based on an entry for the data structure, one or more addresses of buffer 137 that include host data items for the memory access transaction.

In some embodiments, in response to removing host data items associated with the memory access transaction, processing logic can also modify the entry of transaction identifier data structure that corresponds to the transaction identifier for the memory access transaction to indicate that the transaction identifier is available for future memory access transactions. For example, processing device can set a flag of the entry to indicate that the transaction identifier is available or can remove an indication of the address ranges for the host data of the memory access transaction from the entry.

In some embodiments, processing logic can receive an instruction from host system 120 to store host data items that exceed the amount of host data that was indicated for the memory access transaction in the first request from host system 120. For example, the first request can indicate that the amount of host data for the memory access transaction corresponds to approximately 100 total words of memory. In some embodiments, after processing logic receives the first request, processing logic can receive one or more instructions to store an amount of host data that exceeds the 100 total words of memory indicated in the first request. In other or similar embodiments, processing logic can receive an instruction to store a host data item that exceeds a word of memory (e., a wordline of memory, a memory page, a block, etc.). In these embodiments, processing logic can transmit an indication to host system 120 indicating that the memory access transition of the first request is terminated and, in some embodiments, can remove host data items that are associated with the memory access transaction from buffer 137, as described above. Processing logic can also update the transaction identifier data structure, as described above, in some embodiments.

In some embodiments, responsive to receiving one or more host data items to be stored at persistent memory device 150, processing logic can receive an instruction from host system 120 to terminate the memory access transaction. In such embodiments, processing logic can remove host data items that are associated with the memory access transaction from buffer 137, as described above. In some embodiments, processing logic can also update the transaction identifier data structure, as described above.

Figure 3B:
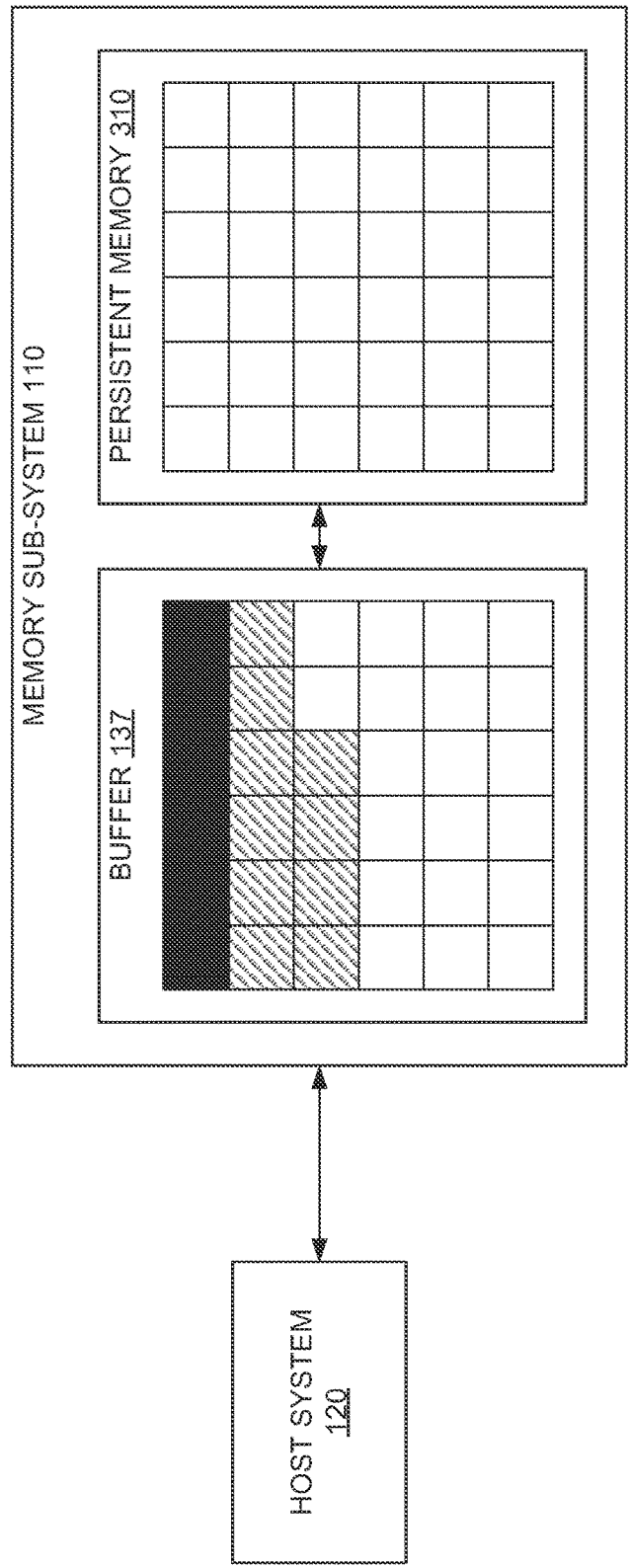

At operation 216, processing logic can initiate one or more operations to commit the memory access transaction. In some embodiments, processing logic can initiate the one or more operations in response to a request from host system 120 to commit the memory access transaction. As described above, committing the memory access transaction, for purposes of the present description, refers to completing the memory access transaction to store the host data items at persistent memory device 150. In some embodiments, the second request can include an indication of the transaction identifier for the memory access transaction. As described above, buffer 137 can store host data items that are associated with multiple transaction identifiers, in some embodiments. Accordingly, processing logic can identify host data items at buffer 137 that are associated with the transaction identifier of the second request, in accordance with previously described embodiments. As illustrated in FIG. 3B, buffer 137 can store one or more first data items associated with the transaction identifier of "0" and one or more additional data items associated with the transaction identifier of "1." Processing logic can identify the first data item(s) associated with the transaction identifier of "0" at buffer 137, in some embodiments.

In some embodiments, the second request can include an indication of the host transaction identifier and the memory sub-system transaction identifier for the memory access transaction. Processing logic can determine whether the memory sub-system transaction identifier included in the second request corresponds to the memory sub-system transaction identifier associated with the memory access transaction that was previously obtained by processing logic and transmitted to host system 120. For example, processing logic can compare the memory sub-system transaction identifier of the second request with the memory sub-system transaction identifier that of the mapping generated for the host transaction identifier of the second request. In response to determining that the memory sub-system transaction identifier of the second request corresponds to the previously obtained memory sub-system transaction identifier, method 200 can continue to operation 218 as described herein. In response to determining that the memory sub-system transaction identifier of the second request does not correspond to the previously obtained memory sub-system transaction identifier, processing logic can transmit a notification to the host system 120 indicating that the host transaction identifier of the second request does not correspond to the memory sub-system transaction identifier included in the second request.

At operation 218, processing logic can migrate the one or more host data items from the memory buffer to persistent memory device 150. In some embodiments, processing logic can migrate the host data items at buffer 137 that are associated with the transaction identifier of the second request, as described herein. Processing logic can migrate the one or more host data items by copying the one or more host data items to a queue associated with persistent memory device 150. A local controller for persistent memory device 150 can store each host data item of the queue to persistent memory device 150 in the order that the host data item is copied to the queue. In some embodiments, the queue for persistent memory device 150 can be a portion of memory that is supported by a local power reserve for memory sub-system 110. For example, the local power reserve for memory sub-system 110 can be a power storage device (e.g., a battery) configured to store enough power such that the local controller for persistent memory device 150 can successfully store all data items copied to the queue at persistent memory device 150 after a power failure of memory sub-system 110. Processing logic can also erase the one or more host data items associated with the memory access transaction from buffer 137.

Figure 3C:
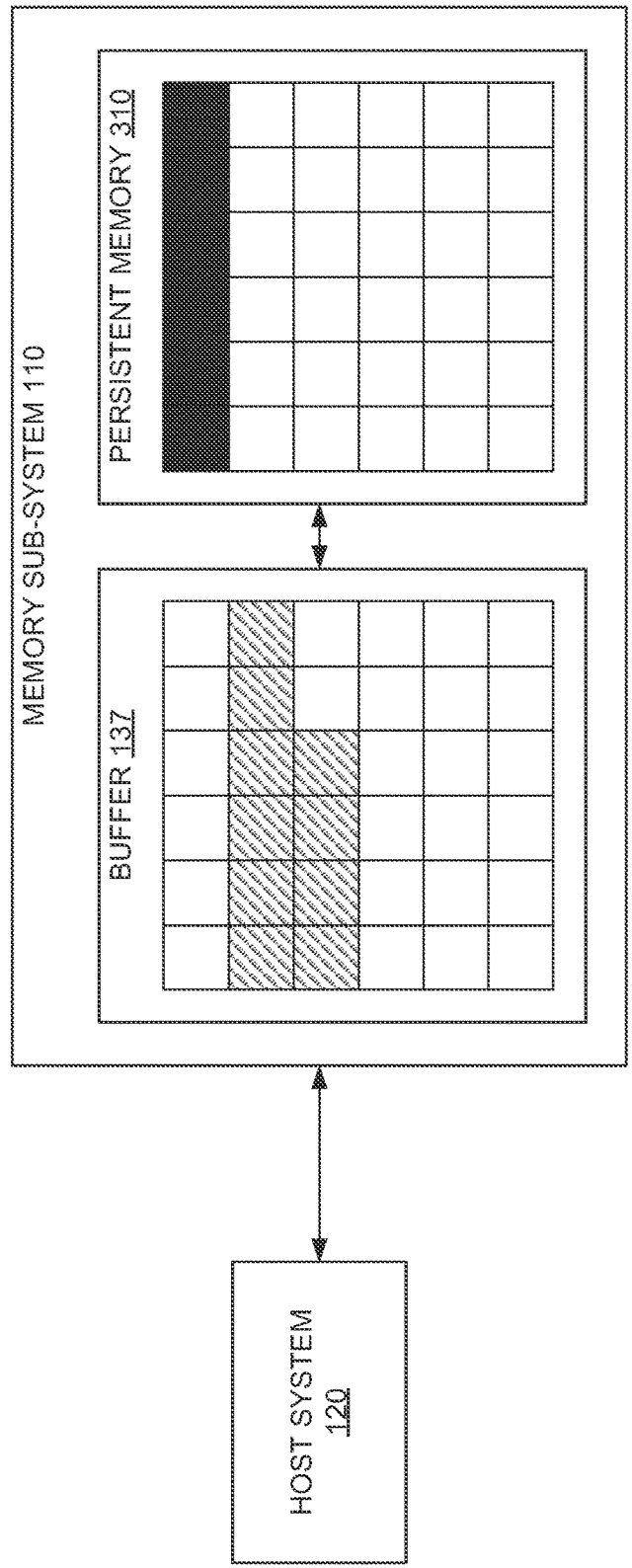

In some embodiments, in response to copying the one or more host data items to the queue associated with persistent memory device 150, processing logic can transmit a notification to host system 120 indicating that the memory access transaction is complete. Processing logic can also, in some embodiments, update the transaction identifier data structure 312 to indicate that the transaction identifier associated with the memory access transaction is available, as previously described. As illustrated in FIG. 3C, processing logic can migrate (e.g., copy) the first data item(s) from buffer 137 to persistent memory 310, as described above. Processing logic can remove (e.g., erase) the first data item(s) from buffer 137 responsive to determining that the first data item(s) are migrated to persistent memory 310, in some embodiments. Processing logic can additionally or alternatively update transaction identifier data structure 312 to indicate that transaction identifier "0" associated with the first data item(s) is available.

As described above, in additional or alternative embodiments, host system 120 can transmit first host data items associated with a virtual address and subsequently can transmit second host data items associated with the virtual address. The first host data items can represent an original state of the host data associated with the virtual address and the second host data items can represent an updated state of the host data, as described above. When the first host data items are received, processing logic can store the first host data items to buffer 137 and persistent memory 310. When the second host data items are received, processing logic can replace the first host data items at persistent memory 310 with the second host data items. Accordingly, persistent memory 310 can store the updated state of the host data. Processing logic can maintain the first host data items (e.g., the original state of the host data) at buffer 137. In some embodiments, processing logic can receive a request to revert the host data to an original state. Accordingly, processing logic can replace the second host data items at persistent memory 310 with the first host data items at buffer 137 (e.g., by copying the first host data items from buffer 137 to a region of persistent memory 310 that is associated with the virtual address). When the request to commit the host data associated with the virtual address is received, processing logic can remove (e.g., erase) the first host data items from buffer 137.

Figure 2B:
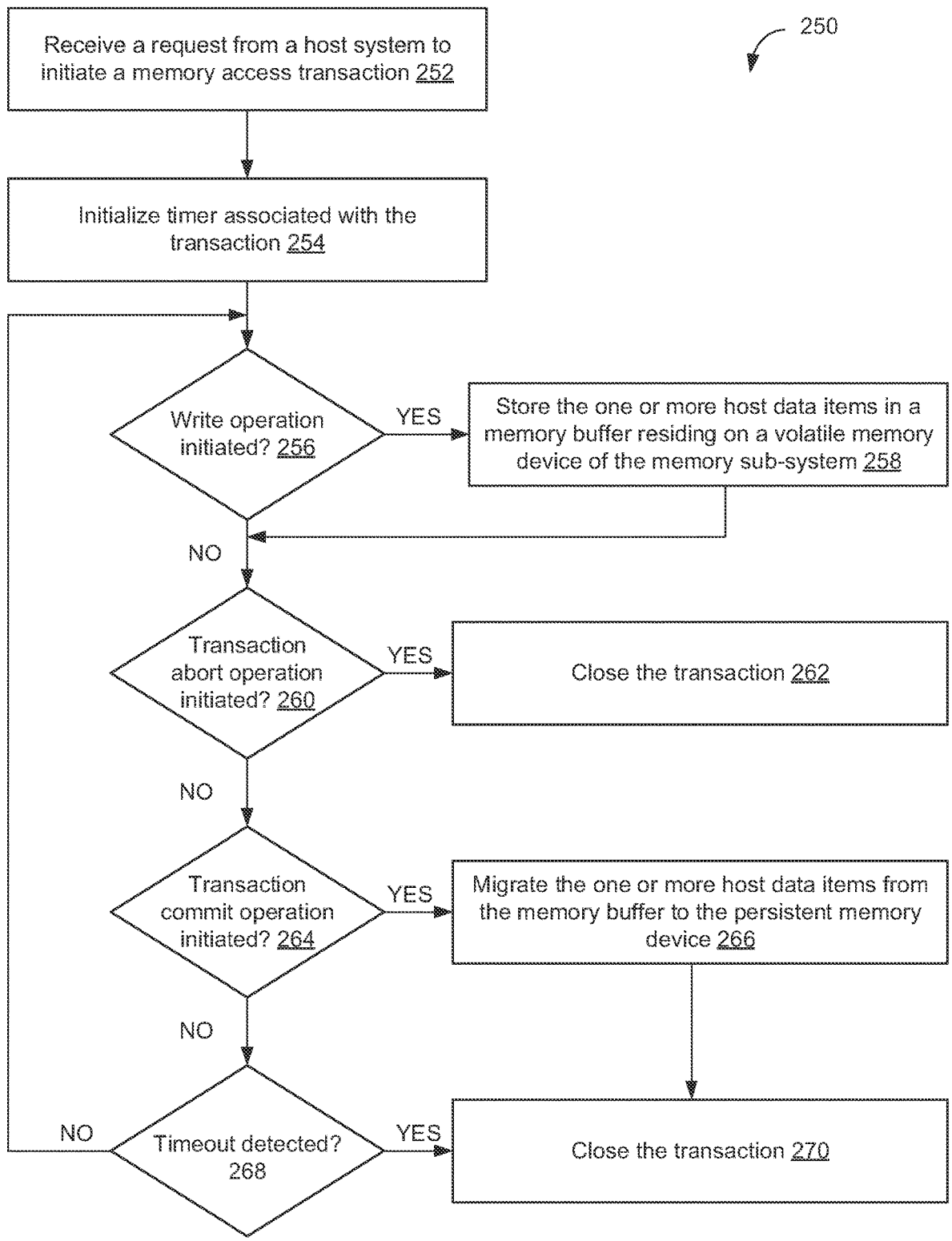
FIG. 2B is a flow diagram of another example method for storing host data at a persistent memory region of a memory sub-system using a persistent memory buffer, in accordance with some embodiments of the present disclosure.

FIG. 2B is a flow diagram of an example method 250 for storing host data at a persistent memory region of a memory sub-system using a persistent memory buffer, in accordance with some embodiments of the present disclosure. The method 250 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 250 is performed by the PM manager component 113 of FIG. 1. In other or similar embodiments, one or more operations of method 250 is performed by another component of the memory sub-system controller. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 252, processing logic can receive a request from a host system (e.g., host system 120) to initiate a memory access transaction, in accordance with previously described embodiments. At operation 254, processing logic can optionally initialize a timer associated with the memory access transaction. In some embodiments, the timer can be a countdown timer that counts down to a particular time period after the timer is initialized. In response to the value of the countdown timer corresponding to the particular time period, the countdown timer can transmit a notification to processing logic indicating that the time period associated with the countdown timer has expired. At operation 256, processing logic can determine whether a write operation is initiated. In some embodiments, a write operation can be initiated in response to a command to write one or more host data items of the memory access transaction to persistent memory (e.g., persistent memory device 150) is received. Processing logic can determine whether a command to write host data items of the memory access transaction has been received by determining whether any write commands received from host system 120 include an indication of a transaction identifier associated with the memory access transaction. In response to processing logic determining that a write command has been received, method 250 can proceed to operation 258. At operation 258, processing logic can store the one or more host data items of the write command in a memory buffer residing on a volatile memory device of the memory sub-system (e.g., memory buffer 137), in accordance with previously described embodiments. In some embodiments, processing logic can initialize the timer of operation 254 after processing logic stores the one or more host data items at memory buffer 137.

In response to processing logic determining that a write operation has not been initiated, method 250 can proceed to operation 260. At operation 260, processing logic can determine whether a transaction abort operation is initiated. In some embodiments, a transaction abort operation can be initiated in response to a transaction abort command received from host system 120. A transaction abort command can cause processing logic to terminate the memory access transaction and remove each data item from buffer 127 and/or persistent memory device 150 that is associated with the memory access transaction. In response to processing logic determining that a transaction abort command has been received from host system 120, method 250 can proceed to operation 262. At operation 262, processing logic can close the memory access transaction at memory sub-system 110. In some embodiments, processing logic can close the memory access transaction by discarding (e.g., erasing) the one or more host data items from memory buffer 137. In some embodiments, processing logic can further update a transaction identifier data structure to indicate that the transaction identifier for the memory access transaction is available for use, in accordance with embodiments described above.

In response to processing logic determining that a transaction abort operation has not been initiated, method 250 can proceed to operation 264. At operation 264, processing logic can determine whether a transaction commit command has been received from host system 120. A transaction commit command can cause processing logic to commit host data items for the memory access transaction to persistent memory device 150, as described above. In response to processing logic determining that a transaction commit command has been received, method 250 can proceed to operation 266. At operation 266, processing logic can migrate the one or more host data items that are associated with the memory access transaction from the memory buffer to the persistent memory device, in accordance with previously described embodiments. In response to migrating the one or more host data items of the memory access transaction to persistent memory device 150, processing logic can close the memory access transaction, in accordance with previously described embodiments.

In response to processing logic determining that a transaction commit operation has not been initiated, method 250 can proceed to operation 268. At operation 268, processing logic can detect whether a memory access transaction timeout has occurred by the previously set timer of operation 254. In some embodiments, processing logic can detect a memory access transaction timeout by determining that the previously set timer has expired. In response to processing logic detecting that a memory access transaction timeout has occurred, method 250 can proceed to operation 270. At operation 270, processing logic can close the memory access transaction, in accordance with previously described embodiments. In some embodiments, processing logic can also transmit a notification to host system 120 indicating that the memory access transaction has been closed. In response to processing logic determining that a memory access transaction timeout has not occurred with respect to operation 268, method can return to operation 256. As described previously, processing logic can optionally initialize a timer associated with the memory access transaction, in accordance with operation 254. If processing logic does not utilize a timer to determine whether to close a memory access transaction, as described with respect to operations 268 and/or operation 270 of method 250. Instead, processing logic can keep the memory access transaction open at memory sub-system 110 until processing logic receives a transaction abort command or a transaction commit command, as described with respect to operations 260 and 264 of method 250.

Figure 4:
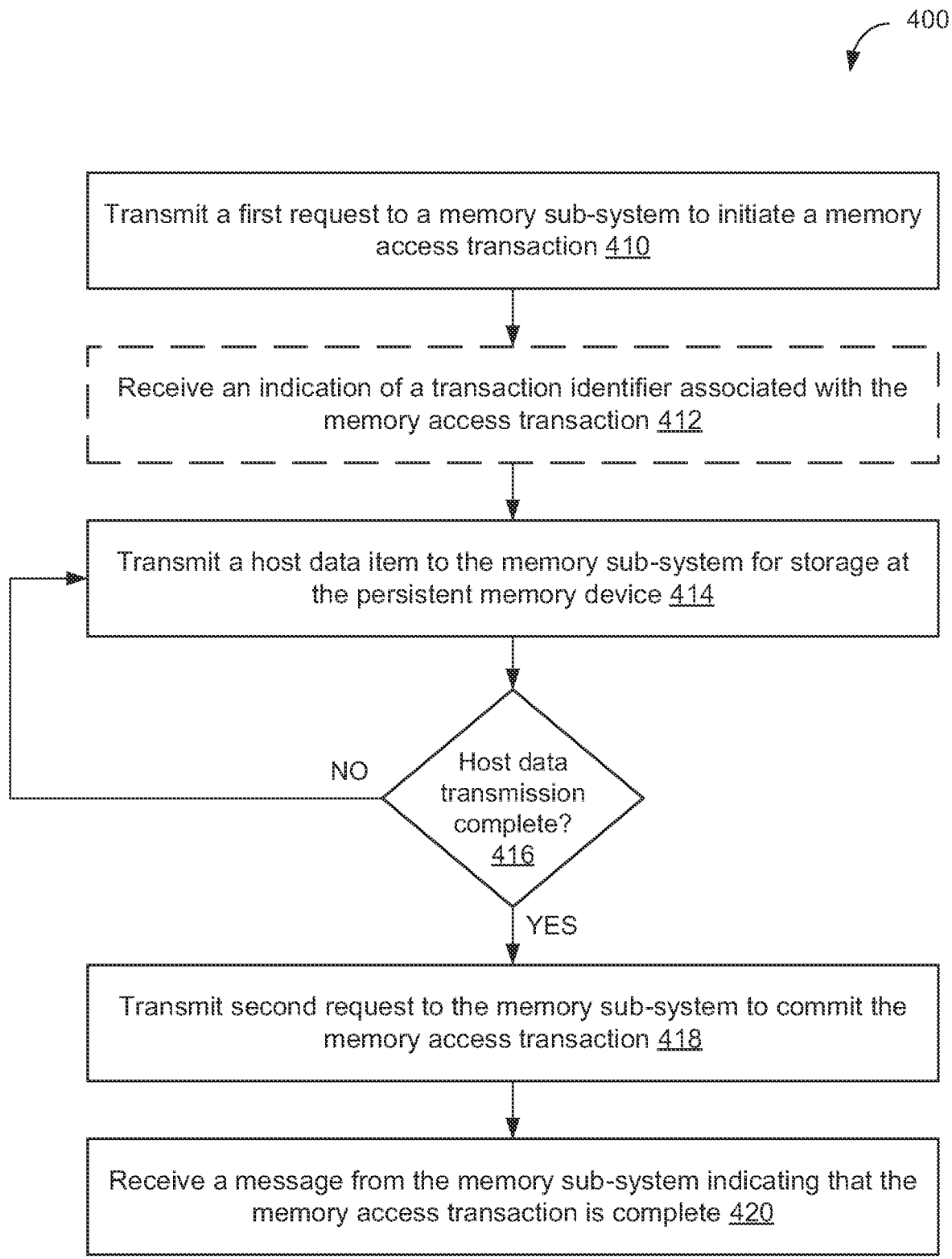
FIG. 4 is a flow diagram of an example method for storing host data at a persistent memory region of a memory sub-system by a host system, in accordance with some embodiments of the present disclosure.

FIG. 4 is a flow diagram of an example method 400 for storing host data at a persistent memory region of a memory sub-system by a host system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by a processing device at host system 120 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, processing logic can transmit a first request to a memory sub-system (e.g., memory sub-system 110) to initiate a memory access transaction. In some embodiments, processing logic can correspond to or can run a thread for a process in a user space of host system 120. The process can be associated with a set of host data items that are used or generated by processing logic as the process is running on host system 120. In some embodiments, processing logic can identify one or more host data items of the set of host data items that are to be stored at persistent memory device 150 of memory sub-system 110. In response to identifying the one or more host data items, processing logic can execute an instruction to block a performance of operations at host system 120 that access the identified one or more host data items at host system 120. Processing logic can transmit the first request to memory sub-system 110 in response to executing the instruction to block the performance of the operations at host system 120.

In some embodiments, the first request can include an indication of a range virtual addresses of persistent memory device 150 at which the one or more host data items for the memory access transaction are to be stored. In other or similar embodiments, the first request can include an indication of an amount of host data for the memory access transaction that is to be stored at persistent memory device 150. In other or similar embodiments, the first request can include the indication of the amount of host data for the memory access transaction and an indication of a first virtual address of the range of virtual addresses of persistent memory device 150.

At operation 412, processing logic can, optionally, receive an indication of a transaction identifier associated with the memory access transaction, in some embodiments. As described above, PM manager component 113 of memory sub-system 110 can generate or obtain a transaction identifier responsive to receiving the first request to initiate the memory access transaction and can transmit an indication of the transaction identifier to host system 120. Responsive to receiving the indication of the transaction identifier, processing logic can store the indication at a memory buffer for host system 120. In other or similar embodiments, processing logic does not receive the transaction identifier from memory sub-system 110 and instead can generate a transaction identifier for the memory access transaction. In such embodiments, processing logic can include the transaction identifier in the first request transmitted to memory sub-system 110.

At operation 414, processing logic can transmit a host data item of the one or more host data items to memory sub-system 110 for storage at the persistent memory device. In some embodiments, processing logic can generate an instruction for PM manager component 113 of memory sub-system 110 to store the host data item at a particular virtual address of persistent memory device 150. The particular virtual address can be included in the range of virtual address included in the first request, as described above. Processing logic can transmit the instruction including the host data item and the particular virtual address to memory sub-system 110. In some embodiments, the instruction can further include the indication of the transaction identifier for the memory access transaction.

At operation 416, processing logic can determine whether each host data item for the memory access transaction has been transmitted to the memory sub-system. Processing logic can determine whether each host data item has been transmitted to the memory sub-system by determining whether an instruction has been transited to memory device 110 to store each of the one or more host data items to persistent memory device 150. In response to processing logic determining that each host data item for the memory access transaction has been transmitted to the memory sub-system, method 400 can continue to operation 418. In response to processing logic determining that each host data item for the memory access transaction has been not been transmitted to the memory sub-system, method 400 can return to operation 414. At operation 418, processing logic can transmit a second request to the memory sub-system to commit the memory access transaction. The second request can include an indication of the transaction identifier for the memory access transaction, as described herein. At operation 420, processing logic can receive a message from the memory sub-system indicating that the memory access transaction is complete.

In some embodiments, processing logic can detect that one or more host data items associated with the process have been updated between a time period where the host data item is transmitted to the memory sub-system (e.g., at or around a time period when an operation associated with block 414 is performed) and a time period where the request to commit the memory access transaction is transmitted (e.g., at or around a time period when an operation associated with block 416 is performed). In such embodiments, processing logic can transmit the updated host data item to memory sub-system 110 and can indicate to memory sub-system 110 (e.g., via a notification and/or request transmitted to memory sub-system 110) that the updated host data item is associated with the same virtual address as the original host data item. PM manager 113 can store the updated host data item at buffer 137 and/or persistent memory 310, in accordance with previously described embodiments.

Figure 5:
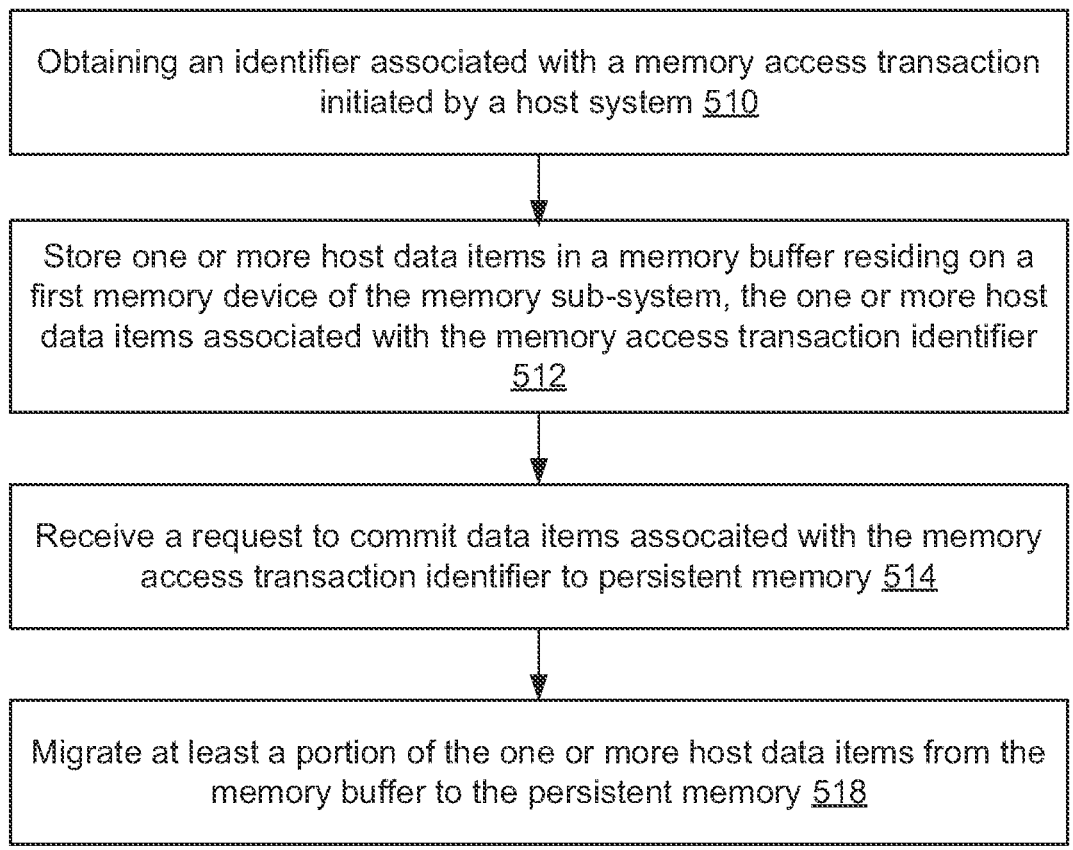
FIG. 5 is a flow diagram of an example method for storing host data at a persistent memory region of a memory sub-system by a host system, in accordance with some embodiments of the present disclosure.

FIG. 5 is a flow diagram of an example method 500 for storing host data at a persistent memory region of a memory sub-system, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the PM manager component 113 of FIG. 1. In other or similar embodiments, one or more operations of method 500 is performed by another component of the memory sub-system controller 110. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 510, processing logic obtains an identifier associated with a memory access transaction initiated by a host system. Processing logic (e.g., PM manager 113) can obtain the memory access transaction identifier as described above. At block 512, processing logic stores one or more host data items in a memory buffer residing on a first memory device of the memory sub-system. The one or more host data items can be associated with the memory access transaction identifier, as described above. At block 514, processing logic receives a request to commit data items associated with the memory access transaction identifier to persistent memory, as described above. At block 518, processing logic migrates at least a portion of the one or more hots data items from the memory buffer to the persistent memory.

Figure 6:
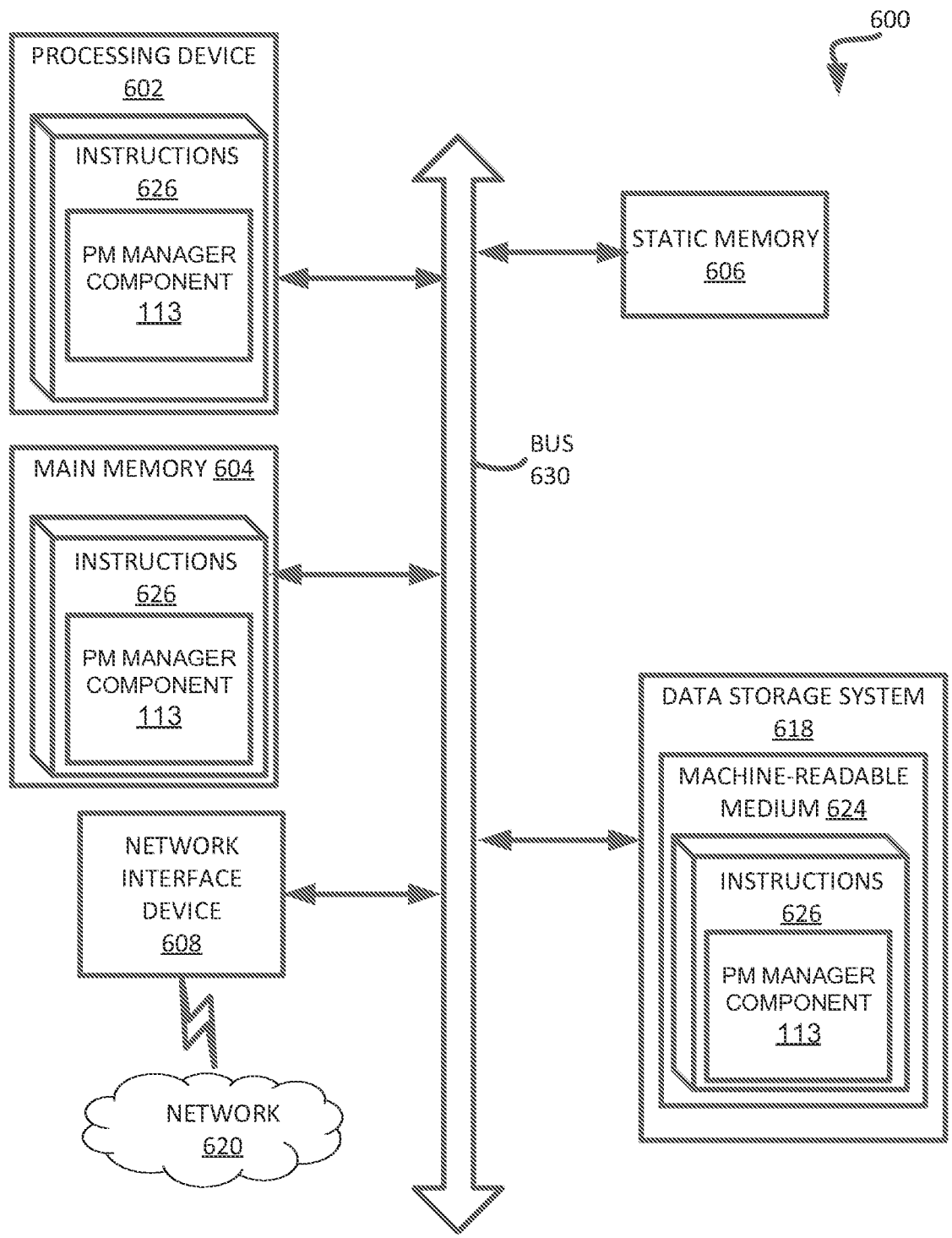
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the PM manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 408 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 500, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a voltage bin boundary component (e.g., the PM manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a processing device of a memory sub-system, a first request from a host system to initiate a memory access transaction, wherein the first request indicates a range of addresses associated with host data items of the memory access transaction;
   allocating a region of a memory buffer residing on a volatile memory device of the memory sub-system for storage of the host data items having addresses within the range of addresses;
   creating, in a metadata structure, a mapping between a transaction identifier for the memory access transaction and the range of addresses associated with the host data items of the memory access transaction;
   storing each incoming host data item having an address within the range of addresses in the memory buffer residing on the volatile memory device;
   identifying, based on the mapping in the metadata structure, one or more host data items that are stored at the memory buffer and associated with the transaction identifier;
   migrating the one or more the host data items from the memory buffer to a persistent memory device;
   updating the metadata structure to remove the mapping between the transaction identifier for the memory access transaction and the range of addresses; and
   committing the memory access transaction.

2. The method of claim 1, further comprising:
   transmitting, to the host system, a notification of successfully committing the memory access transaction.

3. The method of claim 1, further comprising:
   receiving a second request from the host system to commit the memory access transaction.

4. The method of claim 1, further comprising:
   responsive to receiving, from the host system, a third request to abort the memory access transaction before the memory access transaction is committed, discarding the host data items of the memory access transaction from the memory buffer.

5. The method of claim 1, further comprising:
   responsive to failing to receive, within a predefined period of time, a fourth request from the host system to commit the memory access transaction, discarding the host data items of the memory access transaction from the memory buffer.

6. The method of claim 1, wherein the first request references the transaction identifier for the memory access transaction.

7. The method of claim 1, further comprising:
transmitting the transaction identifier to the host system.

8. The method of claim 1, wherein the persistent memory device is a non-volatile memory device or a power protected volatile memory device.

9. The method of claim 1, further comprising:
responsive to receiving the first request, selecting the transaction identifier from a plurality of unique transaction identifiers associated with the memory sub-system, wherein creating the mapping between the transaction identifier for the memory access transaction and the range of addresses makes the transaction identifier unavailable for association with other memory access transactions at the memory sub-system.

10. A memory sub-system comprising:
a first memory device comprising a memory buffer;
a second memory device, wherein one or more portions of the second memory device comprise persistent memory; and
a processing device coupled to the first memory device and the second memory device, the processing device to perform operations comprising:
obtaining a memory access transaction identifier of a memory access transaction initiated by a host system, wherein host data items of the memory access transaction are associated with a range of addresses provided by the host system;
creating, in a metadata structure, a mapping between the memory access transaction identifier of the memory access transaction and the range of addresses provided by the host system;
storing each incoming host data item having an address within the range of addresses in a memory buffer residing on a first memory device of the memory sub-system, wherein the host data items stored in the memory buffer are associated with the memory access transaction identifier;
receiving, from the host system, a request to commit the host data items associated with the memory access transaction identifier to the persistent memory;
identifying, based on the mapping in the metadata structure, one or more host data items that are stored at the memory buffer and associated with the transaction identifier;
migrating the one or more host data items from the memory buffer to the persistent memory; and
updating the metadata structure to remove the mapping between the memory access transaction identifier and the range of addresses.

11. The memory sub-system of claim 10, wherein the operations further comprise:
receiving, from the host system, a request to store one or more additional host data items associated with the memory access transaction identifier to the persistent memory, wherein one or more of the host data items correspond to an original state of host data associated with the host system and the one or more additional host data items correspond to an updated state of the host data; and
storing the one or more additional host data items to the persistent memory.

12. The memory sub-system of claim 11, wherein the operations further comprise;
receiving, from the host system, a request to revert the host data to the original state; and
copying the one or more of the host data items from the memory buffer to a region of the persistent memory that stores the one or more additional host data items.

13. The memory sub-system of claim 10, wherein the operations further comprise:
responsive to receiving, from the host system, a request to abort the memory access transaction before the memory access transaction is committed, discarding the host data items of the memory access transaction from the memory buffer.

14. The memory sub-system of claim 10, wherein the operations further comprise:
responsive to failing to receive, within a predefined period of time, a request from the host system to commit the memory access transaction, discarding the host data items of the memory access transaction from the memory buffer.

15. The memory sub-system of claim 10, wherein obtaining the memory access transaction identifier associated with the memory access transaction comprises:
generating the memory access transaction identifier; and
transmitting an indication of the memory access transaction identifier to the host system.

16. A non-transitory computer-readable storage medium comprising instructions that, when executed by a processing device, cause the processing device to perform operations comprising:
receiving a first request from a host system to initiate a memory access transaction, wherein the first request indicates a range of addresses associated with host data items of the memory access transaction;
allocating a region of a memory buffer residing on a volatile memory device for storage of the host data items having addresses within the range of addresses;
creating, in a metadata structure, a mapping between a transaction identifier for the memory access transaction and the range of addresses associated with the host data items of the memory access transaction;
storing each incoming host data item having an address within the range of addresses in the memory buffer residing on the volatile memory device;
identifying, based on the mapping in the metadata structure, one or more host data items that are stored at the memory buffer and associated with the transaction identifier;
migrating the one or more host data items from the memory buffer to a persistent memory device;
updating the metadata structure to remove the mapping between the transaction identifier for the memory access transaction and the range of addresses; and
committing the memory access transaction.

17. The non-transitory computer-readable storage medium of claim 16, wherein the operations further comprise:
transmitting, to the host system, a notification of successfully committing the memory access transaction.

18. The non-transitory computer-readable storage medium of claim 16, wherein the operations further comprise:
receiving a second request from the host system to commit the memory access transaction.

19. The non-transitory computer-readable storage medium of claim 16, wherein the operations further comprise:
- responsive to receiving, from the host system, a third request to abort the memory access transaction before the memory access transaction is committed, discarding the host data items of the memory access transaction from the memory buffer.

20. The non-transitory computer-readable storage medium of claim 16, wherein the operations further comprise:
- responsive to failing to receive, within a predefined period of time, a fourth request from the host system to commit the memory access transaction, discarding the host data items of the memory access transaction from the memory buffer.

\* \* \* \* \*